(12) United States Patent
Choi

(10) Patent No.: US 6,422,666 B2
(45) Date of Patent: Jul. 23, 2002

(54) ELASTIC CRAWLER

(75) Inventor: Yong Jae Choi, Daeduck-ku (KR)

(73) Assignee: Taeryuk Rubber Belt Co., Ltd., Taejon (KR)

( * ) Notice: Subject to any disclaimer, the term of this patent is extended or adjusted under 35 U.S.C. 154(b) by 0 days.

(21) Appl. No.: 09/854,485

(22) Filed: May 15, 2001

(30) Foreign Application Priority Data

Jun. 23, 2000 (JP) .................................... 2000-190039

(51) Int. Cl.[7] ............................................. B62D 55/24
(52) U.S. Cl. ........................ 305/178; 305/165; 305/173
(58) Field of Search ................................ 305/178, 165, 305/169, 170, 171, 172, 173, 174, 176

(56) References Cited

U.S. PATENT DOCUMENTS

| 5,368,376 | A | * | 11/1994 | Edwards et al. | ............. 305/165 |
| 5,522,655 | A | * | 6/1996 | Katoh | ........................ 305/174 |
| 5,593,218 | A | * | 1/1997 | Katoh et al. | ................ 305/174 |
| 5,813,733 | A | * | 9/1998 | Hori et al. | .................... 305/172 |
| 5,997,110 | A | * | 12/1999 | Katoh et al. | ................ 305/169 |

FOREIGN PATENT DOCUMENTS

| JP | 55-55065 | * | 4/1980 | ................ 305/169 |
| JP | HEI 5-79549 | | 8/1989 | |
| JP | 1-223086 | * | 9/1989 | ................ 305/169 |
| JP | 2609801 | | 5/1995 | |
| JP | 2654926 | | 7/1995 | |

* cited by examiner

*Primary Examiner*—S. Joseph Morano
*Assistant Examiner*—Long Bao Nguyen
(74) *Attorney, Agent, or Firm*—Nixon Peabody LLP; David S. Safran

(57) ABSTRACT

The present invention provides an elastic crawler having an improved flexing properties in which arrangement of lugs are improved so as to prevent deterioration of the flexing properties due to rigidity of a crawler body increased by providing lugs. The crawler includes a crawler body 2, a plurality of core members 3 having right and left wings 3R, 3L, respectively, and provided in the crawler body laterally with respect to the crawler and in parallel to each other with a space therebetween in the longitudinal direction of the crawler, and a plurality of right and left lugs including small lugs provided correspondingly to one of the wings 3R or 3L and large lugs provided correspondingly to two of the wings 3R or 3L adjacent to each other in the longitudinal direction of the crawler.

8 Claims, 4 Drawing Sheets

ELASTIC CRAWLER

BACKGROUND OF THE INVENTION

1. Field of the Invention

The present invention relates to an elastic crawler for endless crawler vehicles for use in the fields of construction, engineering, agriculture and the like.

2. Description of the Related Art

An elastic crawler (rubber crawler), in which a plurality of core metals having right and left wings, respectively, are provided laterally and in parallel with a space in the longitudinal direction of the crawler between the core metals in a crawler body formed of an elastic material into a band shape with no end, and right and left lugs are provided so as to be raised on positions overlapping projected planes of the above right and left wings on a ground-contacting surface side of the above crawler body and allotted to right and left of the center in the widthwise direction of the crawler body, is known in the Japanese Examined Patent Publication No. Hei-79549 and publications of Japanese patents No. 2654926 and No. 2609801, for example.

The above conventional elastic crawler has a basic structure in which lugs having a ground-contacting surface having a length in a circumferential direction covering (extending to) projected planes of two core metal wings adjacent in the longitudinal direction of the crawler on a ground-contacting surface side of the crawler body, are allotted to right and left of the center in the widthwise direction of the crawler body.

In the elastic crawler (rubber crawler) disclosed in the aforementioned publications, the lugs are formed as raised portions allotted to right and left extend to the wings of the core metals adjacent in the longitudinal direction of the crawler so that the rigidity of the crawler body is redoubled, so as to improve endurance of the lugs, thereby improving endurance of the crawler itself.

In the above elastic crawler, however, since all the lugs allotted to right and left are configured to extend to (cover) the two core metal wings adjacent in the longitudinal direction of the crawler, flexing properties at a wrapping section (a section for wrapping the crawler around a driving wheel, for example) are deteriorated due to the lugs. This results in an insufficient engagement with a driving claw, causing a risk of come-off of the crawler from wheels.

Furthermore, in the crawler body, since the rigidity at portions on which lug are formed is large while the rigidity at portions without lugs between the lugs in a longitudinal direction of the band of the crawler body is small. Since the rigidity at the portions with lugs and that at the portions without lugs are remarkably different, and the large and small rigidity portions are arranged in turn across a whole length of the crawler, a crack at a root of the lugs may be caused by a large distortion centered. When the crack becomes large, water or the like penetrated through the crack rusts the core metal or a steel code as a tension resistance body, deteriorating the endurance of the crawler.

The above problem can be solved to a certain degree by forming a concave groove corresponding to a portion between the core metal wings of the lugs (refer to Japanese Patent No. 2654926).

Forming a concave groove on a ground-contacting surface of the lugs, however, causes vibration. The vibration transmitted to and felt by an operator (a driver) may not only cause fatigue, but also have a bad influence on every kind of mounted equipments, components and the like.

SUMMARY OF THE INVENTION

An object of the invention is to improve flexing properties at a wrapping section by contriving an arrangement of lugs with respect to core member wings to avoid a cause of a crack at a root of a lug as well as reduce a cause of vibration, so that endurance of an elastic crawler is greatly improved as a whole.

In order to achieve the above-mentioned object, the following technical ways are taken in the present invention. An elastic crawler comprises a crawler body formed of an elastic material into an endless band shape, a plurality of core members having right and left wings, respectively, provided in the crawler body laterally relative to the crawler and in parallel to each other with a space therebetween in the longitudinal direction of the crawler, and right and left lugs provided so as to be raised at positions overlapping projected planes of the right and left wings on a ground-contacting surface of the crawler body on the right and left sides of the center in the widthwise direction of the crawler.

In an elastic crawler according to the invention, one of the right and left lugs has a ground-contacting surface extending to and overlapping projected planes of a plurality of wings on the same side as the lug adjacent each other in a longitudinal direction of the crawler and having a ground-contacting length in a circumference direction, while the other lug has a ground-contacting surface overlapping a projected plane of a wing on the same side as the lug and having another ground-contacting length in the circumference direction. The ground-contacting length of the latter lug is formed shorter than that of the former lug so that the right and left ground-contacting surfaces are different in the ground-contacting length, and the right and left lugs having the ground-contacting surfaces different in the ground-contacting length are arranged as a pair on the right and left sides of the center in the widthwise direction of the crawler to be staggered along the crawler.

Further, in an elastic crawler according to the invention, one of the above right and left lugs has a ground-contacting surface extending to and overlapping projected planes of two wings of the same side as the lug adjacent each other in the longitudinal direction of the crawler and having a ground-contacting length in a circumferential direction, while the other lug has a ground-contacting surface overlapping a projected plane of a wing on the same side as the lug and having another ground-contacting length in the circumference direction. The ground-contacting length of the latter lug is formed shorter than that of the former lug so that the right and left ground-contacting surfaces are different in the ground-contacting length, and the right and left lugs having the ground-contacting surfaces different in the ground-contacting length are arranged as a pair on the right and left sides of the center in the widthwise direction of the crawler to be staggered along the crawler.

As a result of adopting above structures in which the right and left lugs having the ground-contacting surfaces different in the ground-contacting length are staggered along the crawler and overlap the projected planes of the wings, the flexing properties at the wrapping section are improved and come-off of the crawler can be prevented.

Here, the projected planes of the right and left wings are overlapped entirely or a part of the width of the wings (length in the longitudinal direction of the crawler).

For circulating a crawler body in the longitudinal direction thereof, frictional drive by means of a driving drum provided at the wrapping section may be adopted. Alternatively, a c law of a driving wheel for engaging the crawler body (driving sprocket) may be provided at the wrapping section.

In the case of adopting the latter means, it is recommended to form an engagement aperture f or engaging a driving wheel at the center in the widthwise direction of the crawler body and between the core members adjacent each other in the longitudinal direction of the crawler, and to protrusively form one of the lugs on one of right and left side peripheries of the engagement aperture and protrusively form the other lug on the other side periphery of the aperture at a position forward or rearward from the aperture in the longitudinal direction of the crawler.

It is also recommended that the ground-contacting length in the circumferential direction of the ground-contacting surface of one of the lugs extends to two adjacent core member wings disposed forwardly and rearwardly in the longitudinal direction of the crawler while the ground-contacting length in the circumferential direction of the ground-contacting surface of the other lug overlaps one core member wing, and the ground-contacting surface of the above other lug is shifted forwardly or rearwardly from a corresponding core member wing in order to form a continuous ground-contacting surface in the longitudinal direction of the crawler with the ground-contacting surfaces of the right and left lugs.

As a result of adopting such structure, vibration during driving can be restrained, thereby reducing vibration of a machine body, providing a driver with comfortable driving operation with no fatigue, and preventing troubles in equipment.

Furthermore, it is recommended that right and left protrusions for preventing come-off of the crawler are formed on the right and left sides in the center part in the widthwise direction of the crawler on a no-ground-contacting surface of each core member, the right and left protrusions being arranged to be offset from each other in the longitudinal direction of the crawler so as to be staggered along the crawler, and right and left grooves for flexion laterally extending in the widthwise direction of the crawler between core member wings adjacent each other in the longitudinal direction of the crawler, are formed on the no-ground-contacting surface of the crawler body.

As a result of adopting such structure, the flexing properties at the wrapping section are further improved, so that come-off of the crawler from rolling wheels can be surely prevented also with the right and left protrusions.

DETAILED DESCRIPTION OF THE PREFERRED EMBODIMENTS

A structure and operation of an elastic crawler 1, a rubber crawler in this embodiment, according to the invention will be described hereinafter with reference to the drawings.

FIGS. 1 to 4 show a basic structure of an elastic crawler 1 having a crawler body 2 formed of an elastic material (elastomer) such as rubber into an endless band shape, and a plurality of core members 3 having right and left wings 3R and 3L, respectively, provided laterally relative to the crawler and in parallel to each other with a space therebetween in the longitudinal direction of the crawler.

On a ground-contacting surface of the crawler body 2, right and left lugs 4R and 4L are provided so as to be raised at positions overlapping projected planes of the right and left wings 3R and 3L on the right and left sides of the center in the widthwise direction of the crawler body 2.

The core member 3 is preferably formed of metal castings or a sheet metal (pressed), but may be formed of resin such as rigid resin mixed with reinforcing fiber, for example.

The core member 3 is also provided with right and left protrusions 5R and 5L for preventing come-off of the crawler on the right and left sides in the center part in the widthwise direction of the crawler on a no-ground-contacting surface thereof. The right and left protrusions 5R and 5L are arranged to be offset from each other in the longitudinal direction of the crawler so as to be staggered along the crawler, as shown in FIG. 2.

Figure 4:
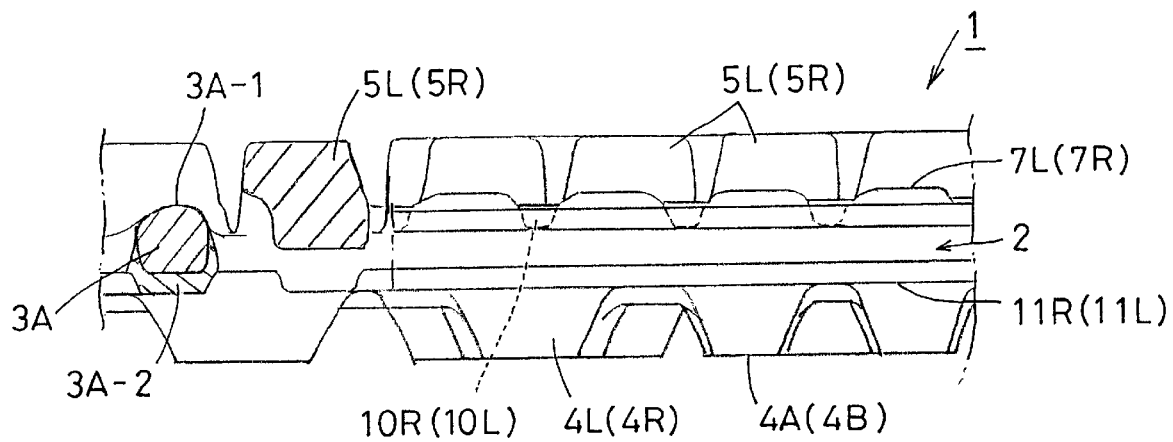
FIG. 4 is a partially cutaway side view of the crawler body in the basic structure of the invention.

The core member 3 in the basic structure shown in the drawings is made of metal castings and the top surfaces of the right and left protrusions 5R and 5L are formed into a flat plane since when a center-rib wheel passes on the core member 3, the right and left portions of the rotary shaft of the wheel roll on the top surfaces. The right and left protrusions 5R and 5L are arranged to be offset from each, as shown in FIG. 2, so as to be substantially continuously provided in the longitudinal direction of the crawler and exclude a cause of vibration of a center-rib rolling wheel. The roots of the right and left protrusions 5R and 5L are connected to each other through a connecting portion 3A which engages a claw of a driving wheel (a sprocket claw), not shown. The connecting portion 3A has an inner peripheral surface 3A-1 formed into an arcuate shape along a concave portion of the claw as shown in FIG. 4 so as to be smoothly engaged with and released from the claw, and an outer peripheral surf ace substantially covered with a cover portion 3A-2 made of rubber so as to prevent rusting.

The crawler body 2 defines engagement apertures 6 to be engaged with and released from a claw of a driving wheel at the center in the widthwise direction of the crawler, which are spaced to each other so as to be positioned forwardly and reawardly in the longitudinal direction of the crawler.

Figure 2:
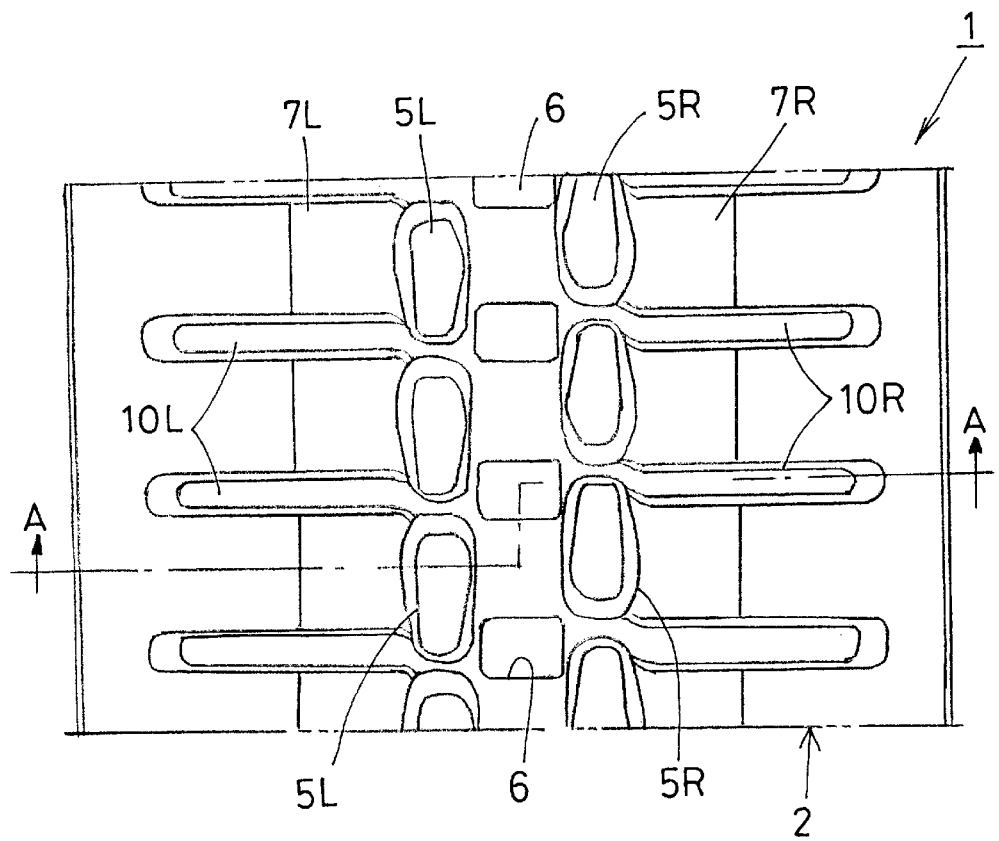
FIG. 2 is a plan view of a no-ground-contacting surface of the crawler body in the basic structure of the invention.

When a straddle wheel passes on the no-ground-contacting surface of the crawler body 2, the wheels roll on band-shaped guide surfaces (rail surfaces) 7R and 7L provided on each outer side part of the right and left protrusions 5R and 5L in the widthwise direction of the crawler, as shown in FIG. 2.

Figure 3:
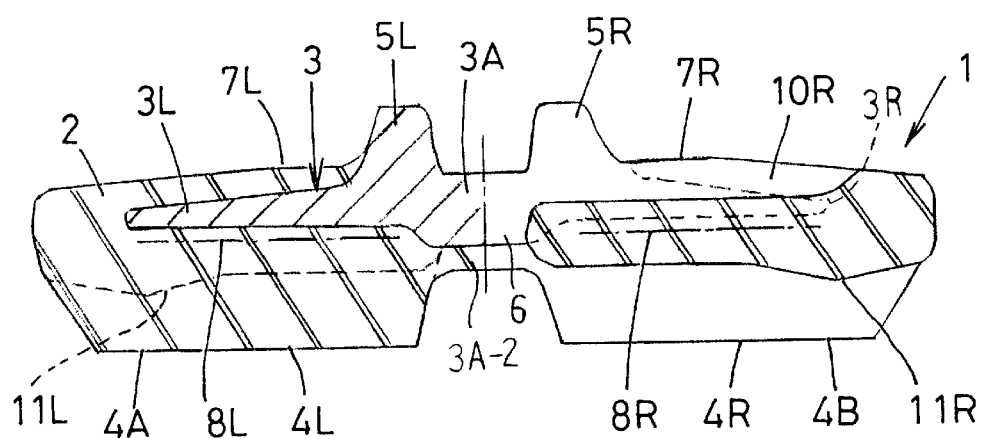
FIG. 3 is a sectional view taken along a line A—A shown in FIG. 2.

Tension resistance members 8R and 8L comprising stacks of steel wire are embedded in the crawler body 2 on the right and left sides of the center in the widthwise direction thereof on the ground-contacting surface side of the right and left wings 3R and 3L of the core member 3, as shown in FIG. 3. The tension resistance members 8R and 8L are formed to be substantially endless so as to prevent the crawler body 2 from extending.

Figure 1:
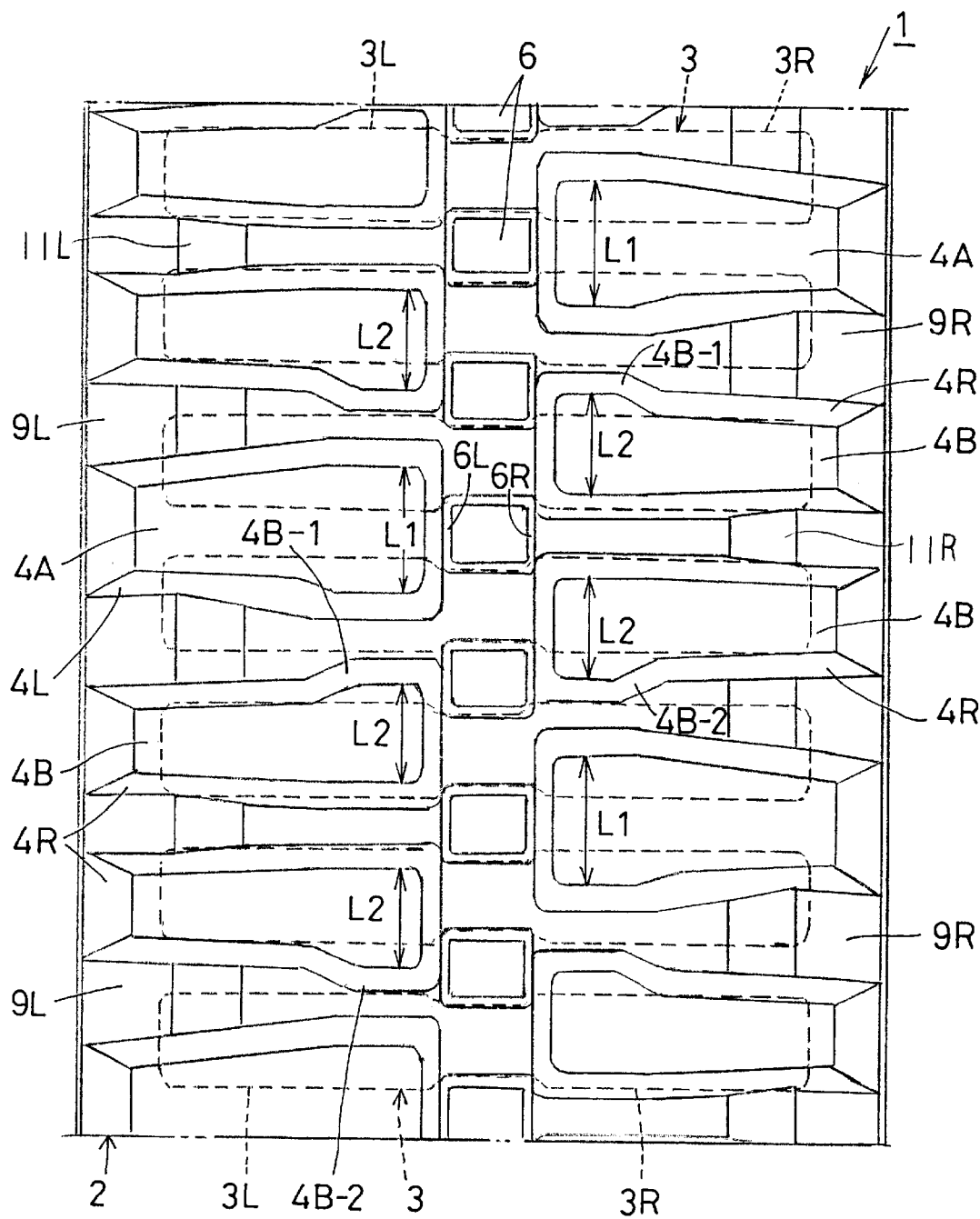
FIG. 1 is a plan view of a ground-contacting surface of a crawler body in a basic structure of the invention.

As shown in FIG. 1, one of the right and left lugs 4R and 4L has a ground-contacting surface 4A extending to and overlapping projected planes of a plurality of (two, in the case of FIG. 1) left or right wings on the same side as the lug adjacent to each other in the longitudinal direction of the crawler and having ground-contacting length L1 in the circumference direction of the crawler. The other one of the lugs 4R and 4L has a pair of ground-contacting surfaces 4B adjacent to each other in the longitudinal direction of the crawler, each of which overlaps a projected plane of a left or right wing located on the opposite side of the lug having the surface 4A and has ground-contacting length L2 in the circumference direction. The ground-contacting length L2 of the ground-contacting surface 4B in the latter lug 4R 4L is formed shorter than the ground-contacting length L1 of the ground-contacting surface 4A in the formaer lug 4R or 4L, so that the ground-contacting surfaces 4A and 4B having different ground-contacting lengths L1 and L2 are arranged on the right and left sides. The right and left lugs 4R and 4L having the ground-contacting surfaces 4A and 4B, respectively, in which the ground-contacting lengths L1 and L2 are different, are disposed on the right and left sides of the center in the widthwise direction of the crawler body 2 to be staggered along the crawler.

For the purpose of easy understanding, in the basic structure shown in FIG. 1, the lug 4L having the longer ground-contacting length L1 will be referred to as a large lug 4L, while the lug 4R having the shorter length L2 will be referred to as a small lug 4R hereinafter. The large lug 4L is disposed so as to extend to the projected planes of the two adjacent wings 3L in the longitudinal direction of the crawler, while a pair of small lugs 4R are respectively disposed on the projected plane of each one of the two wings 3R and 3R adjacent in the longitudinal direction of the crawler. The one large lug 4L and the pair of small lugs 4R are arranged as a group alternately so as to be staggered along the crawler.

As shown in FIG. 1, the one large lug 4L is protrusively formed on one of the right and left side peripheries 6L of the engagement aperture 6 while the pair of small lugs 4R are protrusively formed on the other side periphery 6R at forward and rearward positions in the longitudinal direction of the crawler, so that the respective lugs are raised at positions arranged to be staggered along the crawler. In order to form a continuous ground-contacting surface in the longitudinal direction of the crawler with the ground-contacting surfaces 4A and 4B of the above left and right large and small lugs 4L and 4R, the ground-contacting surfaces 4B of the pair of small lugs 4R are shifted (expanded) toward opposite directions so that the front one is forwardly expanded while the rear one is rearwardly expanded in the longitudinal direction from the positions of the corresponding core member wings 3R or 3L. Reference numerals 4B-1 and 4B-2 denote the expanded portions.

The above described combination in the arrangement among the right and left wings 3R and 3L of the core member 3, the engagement aperture 6, and the left and right large and small lugs 4L and 4R decreases distortion centered in the roots of the right and left lugs 4R and 4L to improve rigidity of the crawler body 2, ensures preferable flexing properties at the wrapping section, and restrains vibration.

In the basic structure shown in FIG. 1, the large lug 4L extends so as to cover around a half of the projected plane of each of the two wings 3L adjacent in the longitudinal direction of the crawler, while the pair of small lugs 4R are arranged so that their phases are shifted forwardly and rearwardly in the longitudinal direction of the crawler from each of the right wings 3R. Each of the ground-contacting surfaces 4A and 4B of the large and small lugs 4L and 4R has an end portion having the largest width (length in the longitudinal direction of the crawler) at the center of the crawler in the widthwise direction thereof, the width gradually becomes smaller toward the side edges of the crawler in the widthwise direction thereof, so that there is provided earth removing portions 9R and 9L outwardly flared in the widthwise direction of the crawler at the spaces between the lugs.

Moreover, in order to further improve flexing properties of the crawler at the wrapping section, there is provided right and left grooves for flexion 10R and 10L extending in the widthwise direction of the crawler and being almost linearly arranged to each other between the core member wings adjacent to each other in the longitudinal direction of the crawler, on the no-ground-contacting surface of the crawler body 2, as shown in FIG. 2. A bottom of each of the grooves 10R and 10L is formed into an arc shape as shown in FIG. 4 so as to prevent concentration of stress.

In FIGS. 1 and 3, reference numbers 11L and 11R denote protectors in the right and left outer peripheries of the right and left tension resistance members (tension resistance bands) 8R and 8L, which are formed into a band shape by raising a portion between the lugs. The large and small lugs 4L and 4R outwardly extend beyond the length of the right and left wings 3R and 3L in the widthwise direction of the crawler.

Figure 5:
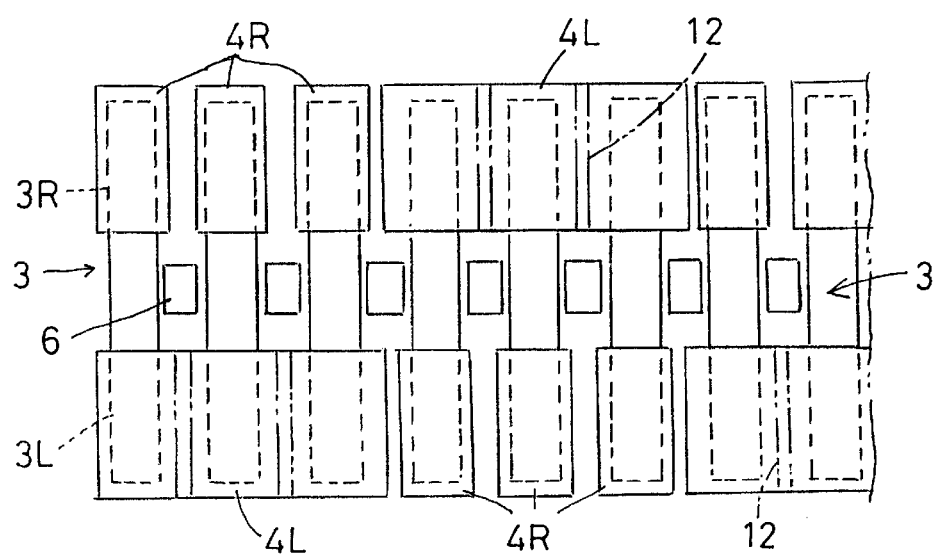
FIG. 5 is a schematic plan view showing another embodiment of the invention.
Figure 6:
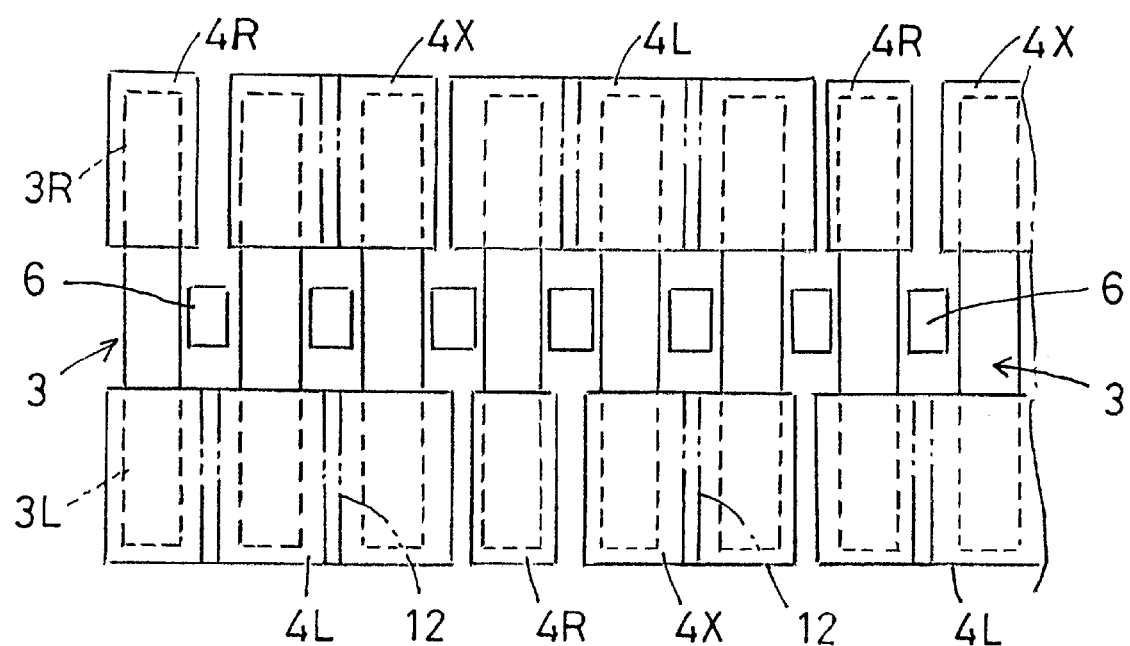
FIG. 6 is a schematic plan view showing another embodiment of the invention.

FIGS. 5 and 6 show other embodiments of the invention. In FIGS. 5 and 6, relation in an arrangement of the core member 3, the large and small lugs 4L and 4R, and the engagement aperture 6 is shown.

In the embodiment shown in FIG. 5, the large lug 4L has the ground-contacting surface 4A extending to the three wings 3L or 3R while the small lug 4R has the ground-contacting surface 4B covering the projected plane of each one of the wing 3R or 3L. The large and small lugs 4L and 4R are arranged as a group alternately so as to be staggered along the crawler.

In the embodiment shown in FIG. 6, totally three kinds (large, middle and small) of lugs, namely, each one of the large and small lugs 4L and 4R and one middle lug 4X are arranged as a group alternately so as to be staggered along the crawler.

That is, the small lug 4R is disposed correspondingly to one core member wing 3R or 3L and the middle lug 4X is disposed so as to extend to the other two wings 3R or 3L, when the large lug 4L is disposed so as to extend to the three core member wings 3L or 3R.

Though the embodiments exemplified in FIGS. 5 and 6 can achieve the intended object, the large lug 4L of these embodiments having greater volumes than the embodiment (basic embodiment) shown in FIGS. 1 to 4 may have slightly inferior flexing properties at the wrapping section.

In order to avoid the above problem, it is preferred to provide a concave groove extending in the widthwise direction of the crawler on the ground-contacting surface of the lug, as shown by a reference number 12 in FIGS. 5 and 6, so as to improve flexing.

While the presently preferred embodiments of the present invention have been described in detail, as will be apparent with those familiar with the art, various variations and modifications can be made in embodiments without departing from the scope of the invention defined by the following claims. For example, it is possible to modify the design as follows: (1) one or both of the right and left protrusions 5R and 5L for preventing come-off of the crawler are formed of rubber; (2) a drum-type drive unit is adopted driving a crawler; (3) reinforcing fiber is mixed to elastomer for forming the crawler body or the lug; and (4) a band-shaped belt plate is adopted as a tension resistance member.

As described above, the elastic crawler according to the present invention has improved flexing properties at the wrapping section which ensures prevention of come-off of the crawler, reduces vibration, as well as improves durability.

What is claimed is:

1. An elastic crawler, comprising a crawler body formed of an elastic material into an endless band; a plurality of core members having right and left wings, respectively, and provided in the crawler body laterally with respect to the crawler body and in parallel to each other with a space therebetween in the longitudinal direction of the crawler; and a pair of right and left lugs raised at positions overlapping projected planes of the right and left wings, respectively, on a ground-contacting surface of the crawler body on the right and left sides of a center in a widthwise direction of the crawler body, wherein one of the pair of right and left lugs has a ground-contacting surface extending to and overlapping projected planes of a plurality of right or left wings on the same side as the lug adjacent each other in a longitudinal direction of the crawler and having a ground-contacting length in a circumference direction of the crawler, while the other lug has a ground-contacting surface overlapping a projected plane of one of the right and left wings on the same side as the lug and having another ground-contacting length in the circumference direction, the ground-contacting length of the latter lug being formed shorter than that of the former lug so that the ground-contacting surfaces of the pair of right and left lugs are different in the ground-contacting length, the pair of right and left lugs having the ground-contacting surfaces different in the ground-contacting lengths being alternately arranged in the longitudinal direction of the crawler so as to be staggered along the crawler.

2. An elastic crawler, comprising a crawler body formed of an elastic material into an endless band; a plurality of core members having right and left wings, respectively, and provided in the crawler body laterally with respect to the crawler body and in parallel to each other with a space therebetween in the longitudinal direction of the crawler; and a pair of right and left lugs raised at positions overlapping projected planes of the right and left wings, respectively, on a ground-contacting surface of the crawler body on the right and left sides of a center in a widthwise direction of the crawler body, wherein one of the pair of right and left lugs has a ground-contacting surface extending to and overlapping projected planes of two of right or left wings on the same side as the lug adjacent each other in a longitudinal direction of the crawler and having a ground-contacting length in a circumference direction of the crawler, while the other lug has a ground-contacting surface overlapping a projected plane of one of the right and left wings on the same side as the lug and having another ground-contacting length in the circumference direction, the ground-contacting length of the latter lug being formed shorter than that of the former lug so that the ground-contacting surfaces of the pair of right and left lugs are different in the ground-contacting length, the pair of right and left lugs having the ground-contacting surfaces different in the ground-contacting lengths being alternately arranged in the longitudinal direction of the crawler so as to be staggered along the crawler.

3. The elastic crawler according to claim 1, wherein an engagement aperture for engaging a driving wheel is formed at a center in the widthwise direction of the crawler between the core members adjacent in the longitudinal direction of the crawler, and one of the right or left lugs having the longer ground-contacting length is protrusively formed on the right or left side periphery of the engagement aperture while the other lug having the shrter ground-contacting length is protrusively formed on the other side periphery of the engagement aperture at a forward or rearward position therefrom in the longitudinal direction of the crawler.

4. The elastic crawler according to claim 2, wherein an engagement aperture for engaging a driving wheel is formed at a center in the widthwise direction of the crawler between the core members adjacent in the longitudinal direction of the crawler, and one of the right or left lugs having the longer ground-contacting length is protrusively formed on the right or left side periphery of the engagement aperture while the other lug having the shrter ground-contacting length is protrusively formed on the other side periphery of the engagement aperture at a forward or rearward position therefrom in the longitudinal direction of the crawler.

5. The elastic crawler according to claim 1, wherein the ground-contacting surface of one of the lugs has a ground-contacting length in the circumferential direction of the crawler extending to and overlapping the projected planes of two adjacent core member wings in the longitudinal direction of the crawler while the ground-contacting surface of the other lug has a ground-contacting length in the circumferential direction overlapping the projected plane of each core member wing, and a pair of the ground-contacting surfaces of the latter lugs adjacent in the longitudinal direction of the crawler are oppositely shifted forwardly and rearwardly, respectively, from corresponding core member wings so that the ground-contacting surfaces of the right and left lugs are arranged form a continuous ground-contacting surface in a longitudinal direction of the crawler.

6. The elastic crawler according to claim 2, wherein the ground-contacting surface of one of the lugs has a ground-contacting length in the circumferential direction of the crawler extending to and overlapping the projected planes of two adjacent core member wings in the longitudinal direction of the crawler while the ground-contacting surface of the other lug has a ground-contacting length in the circumferential direction overlapping the projected plane of each core member wing, and a pair of the ground-contacting surfaces of the latter lugs adjacent in the longitudinal direction of the crawler are oppositely shifted forwardly and rearwardly, respectively, from corresponding core member wings so that the ground-contacting surfaces of the right and left lugs are arranged form a continuous ground-contacting surface in a longitudinal direction of the crawler.

7. The elastic crawler according to claim 1, wherein each of the core members is formed with right and left protrusions for preventing come-off of the crawler on the right and left sides of the center part in the widthwise direction of the crawler on a no-ground-contacting surface thereof, the right and left protrusions being arranged to be offset from each other in the longitudinal direction of the crawler so as to be staggered along the crawler, and the crawler body is formed on the no-ground-contacting surface thereof with right and left grooves for flexion extending in the widthwise direction of the crawler between core member wings adjacent in the longitudinal direction of the crawler.

8. The elastic crawler according to claim 2, wherein each of the core members is formed with right and left protrusions for preventing come-off of the crawler on the right and left sides of the center part in the widthwise direction of the crawler on a no-ground-contacting surface thereof, the right and left protrusions being arranged to be offset from each other in the longitudinal direction of the crawler so as to be staggered along the crawler, and the crawler body is formed on the no-ground-contacting surface thereof with right and left grooves for flexion extending in the widthwise direction of the crawler between core member wings adjacent in the longitudinal direction of the crawler.

* * * * *